(12) United States Patent
Aanen et al.

(10) Patent No.: US 6,789,017 B2
(45) Date of Patent: Sep. 7, 2004

(54) VEHICLE STEERING ANGLE POSITION DETERMINATION METHOD

(75) Inventors: Arie G. Aanen, Stuttgart (DE); Charles U. Amanze, Southfield, MI (US)

(73) Assignee: Robert Bosch Corporation, Broadview, IL (US)

( * ) Notice: Subject to any disclaimer, the term of this patent is extended or adjusted under 35 U.S.C. 154(b) by 3 days.

(21) Appl. No.: 10/367,136

(22) Filed: Feb. 14, 2003

(65) Prior Publication Data

US 2003/0212476 A1 Nov. 13, 2003

Related U.S. Application Data

(60) Provisional application No. 60/357,467, filed on Feb. 15, 2002.

(51) Int. Cl.[7] .............................. B62P 5/00; G06F 7/00
(52) U.S. Cl. .................... 701/401; 701/42; 702/151; 180/204; 180/6.2; 180/6.28; 180/6.24
(58) Field of Search ................... 701/41, 42, 1, 701/36, 92; 702/151; 180/204, 6.2, 6.24, 6.28

(56) References Cited

U.S. PATENT DOCUMENTS

| | | | |
|---|---|---|---|
| 3,608,925 A | 9/1971 | Murphy | 280/112 |
| 3,895,816 A | 7/1975 | Takahashi et al. | 280/6 |
| 4,313,529 A | 2/1982 | Kato et al. | 188/299 |
| 4,345,661 A | 8/1982 | Nishikawa | 180/141 |
| 4,392,540 A | 7/1983 | Michio et al. | 180/142 |
| 4,555,126 A | 11/1985 | Ishimitsu et al. | 280/707 |
| 4,564,214 A | 1/1986 | Tokunaga et al. | 280/707 |
| 4,575,116 A | 3/1986 | Miyata | 280/707 |
| 4,621,833 A | 11/1986 | Soltis | 280/707 |
| 4,652,011 A | 3/1987 | Hollerweger et al. | 280/771 |
| 4,690,431 A | 9/1987 | Ito et al. | 280/771 |
| 4,706,771 A | 11/1987 | Kawabe et al. | 180/142 |
| 4,706,979 A | 11/1987 | Kawabe et al. | 280/91 |
| 4,718,685 A | 1/1988 | Kawabe et al. | 280/91 |
| 4,720,791 A | 1/1988 | Daido | 364/424 |
| 4,722,545 A | 2/1988 | Gretz et al. | 280/771 |
| 4,767,588 A | 8/1988 | Ito | 364/424 |
| 4,803,629 A | 2/1989 | Noto et al. | 364/424.05 |
| 4,834,204 A | 5/1989 | Ito et al. | 180/140 |
| 4,836,319 A | 6/1989 | Haseda et al. | 180/142 |
| 4,840,389 A | 6/1989 | Kawabe et al. | 280/91 |
| 4,856,607 A | 8/1989 | Sueshige et al. | 180/142 |
| 4,867,466 A | 9/1989 | Soltis | 280/94 |
| 4,882,693 A | 11/1989 | Yopp | 364/424.01 |
| 4,884,647 A | 12/1989 | Mimuro et al. | 180/140 |
| 4,939,654 A | 7/1990 | Kouda et al. | 364/424.05 |
| 4,947,328 A | 8/1990 | Sugasawa | 364/424.05 |

(List continued on next page.)

FOREIGN PATENT DOCUMENTS

| | | |
|---|---|---|
| DE | 4015618 A1 | 11/1991 |
| DE | 4130142 A1 | 3/1993 |
| JP | 3-128768 | 5/1991 |
| JP | 4-252912 | 9/1992 |
| JP | 6-255530 | 9/1994 |

*Primary Examiner*—Thomas G. Black
*Assistant Examiner*—Olga Hernandez
(74) *Attorney, Agent, or Firm*—Baker & Daniels

(57) ABSTRACT

A system for calculating the actual steering angle position based upon signals received from a relative position steering angle sensor and other vehicle sensors. The system involves calculating a steering angle value based upon a plurality of vehicle models and then weighting and combining the values to determine a steering angle reference value which is used to calculate an offset value which can be applied to the relative position steering angle sensor value to provide a true steering angle value. The vehicle models include a yaw rate model, a lateral acceleration model, a front axle model and a rear axle model. An uncertainty factor is calculated and used to filter the offset value. The data used to determine the offset value may be obtained when the vehicle is driving forward and also when driving rearwardly and relatively straight.

22 Claims, 9 Drawing Sheets

U.S. PATENT DOCUMENTS

| | | |
|---|---|---|
| 4,961,474 A | 10/1990 | Daido et al. ............... 180/79.1 |
| 4,996,657 A | 2/1991 | Shiraishi et al. ............ 364/559 |
| 4,999,776 A | 3/1991 | Soltis et al. ............ 364/424.05 |
| 5,001,637 A | 3/1991 | Shiraishi et al. ....... 364/424.05 |
| 5,032,996 A | 7/1991 | Shiraishi ............... 364/424.05 |
| 5,065,323 A | 11/1991 | Shiraishi et al. ....... 364/424.05 |
| 5,065,324 A | 11/1991 | Oshita et al. .......... 364/424.05 |
| 5,121,322 A | 6/1992 | Shiraishi et al. ....... 364/424.05 |
| 5,243,188 A | 9/1993 | Hattori et al. ......... 250/231.17 |
| 5,253,172 A | 10/1993 | Ito et al. ................ 364/424.05 |
| 5,311,432 A | 5/1994 | Momose ............... 364/424.05 |
| 5,343,393 A | 8/1994 | Hirano et al. .......... 364/424.05 |
| 5,422,810 A | 6/1995 | Brunning et al. ...... 364/424.05 |
| 5,434,784 A | 7/1995 | Bradley et al. ......... 364/424.05 |
| 5,465,210 A | 11/1995 | Walenty ................. 364/424.05 |
| 5,732,372 A | 3/1998 | Marsden ....................... 701/41 |
| 5,787,375 A | 7/1998 | Madau et al. .................. 701/41 |
| 5,790,966 A | 8/1998 | Madau et al. .................. 701/41 |
| 6,130,706 A | 10/2000 | Hart, Jr. et al. |
| 6,223,116 B1 | 4/2001 | Kin et al. |
| 6,233,505 B1 | 5/2001 | Kranz et al. |
| 6,233,513 B1 | 5/2001 | Furukawa et al. |
| 6,345,218 B1 | 2/2002 | Yamanaka et al. |
| 6,349,256 B1 | 2/2002 | Kin et al. |
| 6,405,113 B1 | 6/2002 | Yamawaki et al. |
| 2004/0024565 A1 * | 2/2004 | Yu et al. ..................... 702/151 |

\* cited by examiner

CertFactor Values

| | | CenterFindPct (Certainty) | | | | | | | | | | | | | | | | | | |
|---|---|---|---|---|---|---|---|---|---|---|---|---|---|---|---|---|---|---|---|---|
| | 20 | Maximum allowable error in Mode2 | | | | | | | | | | | | | | | | | | |
| | 40 | Minimum allowable tCenterFnd value to enter Mode2 | | | | | | | | | | | | | | | | | | |
| | | | | | | Average Uncertainty (Lw Uncer)[deg] | | | | | | | | | | | | | | |
| | | 30 | 28 | 26 | 24 | 22 | 20 | 19 | 18 | 17 | 16 | 15 | 14 | 13 | 12 | 11 | 10 | 8 | 6 | 4 |
| | 40 | 2.00 | 2.00 | 2.00 | 2.00 | 2.00 | 2.00 | 2.11 | 2.22 | 2.35 | 2.50 | 2.67 | 2.86 | 3.08 | 3.33 | 3.64 | 4.00 | 4.00 | 4.00 | 4.00 |
| | 41 | 2.00 | 2.00 | 2.00 | 2.00 | 2.00 | 2.05 | 2.16 | 2.28 | 2.41 | 2.56 | 2.73 | 2.93 | 3.15 | 3.42 | 3.73 | 4.10 | 4.10 | 4.10 | 4.10 |
| | 42 | 2.00 | 2.00 | 2.00 | 2.00 | 2.00 | 2.10 | 2.21 | 2.33 | 2.47 | 2.63 | 2.80 | 3.00 | 3.23 | 3.50 | 3.82 | 4.20 | 4.20 | 4.20 | 4.20 |
| t | 43 | 2.00 | 2.00 | 2.00 | 2.00 | 2.00 | 2.15 | 2.26 | 2.39 | 2.53 | 2.69 | 2.87 | 3.07 | 3.31 | 3.58 | 3.91 | 4.30 | 4.30 | 4.30 | 4.30 |
| C | 44 | 2.00 | 2.00 | 2.00 | 2.00 | 2.00 | 2.20 | 2.32 | 2.44 | 2.59 | 2.75 | 2.93 | 3.14 | 3.38 | 3.67 | 4.00 | 4.40 | 4.40 | 4.40 | 4.40 |
| e | 45 | 2.00 | 2.00 | 2.00 | 2.00 | 2.00 | 2.25 | 2.37 | 2.50 | 2.65 | 2.81 | 3.00 | 3.21 | 3.46 | 3.75 | 4.09 | 4.50 | 4.50 | 4.50 | 4.50 |
| n | 46 | 2.00 | 2.00 | 2.00 | 2.00 | 2.00 | 2.30 | 2.42 | 2.56 | 2.71 | 2.88 | 3.07 | 3.29 | 3.54 | 3.83 | 4.18 | 4.60 | 4.60 | 4.60 | 4.60 |
| t | 47 | 2.00 | 2.00 | 2.00 | 2.00 | 2.00 | 2.35 | 2.47 | 2.61 | 2.76 | 2.94 | 3.13 | 3.36 | 3.62 | 3.92 | 4.27 | 4.70 | 4.70 | 4.70 | 4.70 |
| e | 48 | 2.00 | 2.00 | 2.00 | 2.00 | 2.00 | 2.40 | 2.53 | 2.67 | 2.82 | 3.00 | 3.20 | 3.43 | 3.69 | 4.00 | 4.36 | 4.80 | 4.80 | 4.80 | 4.80 |
| r | 49 | 2.00 | 2.00 | 2.00 | 2.00 | 2.00 | 2.45 | 2.58 | 2.72 | 2.88 | 3.06 | 3.27 | 3.50 | 3.77 | 4.08 | 4.45 | 4.90 | 4.90 | 4.90 | 4.90 |
| F | 50 | 2.00 | 2.00 | 2.00 | 2.00 | 2.00 | 2.50 | 2.63 | 2.78 | 2.94 | 3.13 | 3.33 | 3.57 | 3.85 | 4.17 | 4.55 | 5.00 | 5.00 | 5.00 | 5.00 |
| n | 51 | 2.00 | 2.00 | 2.00 | 2.00 | 2.00 | 2.55 | 2.68 | 2.83 | 3.00 | 3.19 | 3.40 | 3.64 | 3.92 | 4.25 | 4.64 | 5.10 | 5.10 | 5.10 | 5.10 |
| d | 52 | 2.00 | 2.00 | 2.00 | 2.00 | 2.00 | 2.60 | 2.74 | 2.89 | 3.06 | 3.25 | 3.47 | 3.71 | 4.00 | 4.33 | 4.73 | 5.20 | 5.20 | 5.20 | 5.20 |
| [-] | 53 | 2.00 | 2.00 | 2.00 | 2.00 | 2.00 | 2.65 | 2.79 | 2.94 | 3.12 | 3.31 | 3.53 | 3.79 | 4.08 | 4.42 | 4.82 | 5.30 | 5.30 | 5.30 | 5.30 |
| | 54 | 2.00 | 2.00 | 2.00 | 2.00 | 2.00 | 2.70 | 2.84 | 3.00 | 3.18 | 3.38 | 3.60 | 3.86 | 4.15 | 4.50 | 4.91 | 5.40 | 5.40 | 5.40 | 5.40 |
| | 55 | 2.00 | 2.00 | 2.00 | 2.00 | 2.00 | 2.75 | 2.89 | 3.06 | 3.24 | 3.44 | 3.67 | 3.93 | 4.23 | 4.58 | 5.00 | 5.50 | 5.50 | 5.50 | 5.50 |
| | 56 | 2.00 | 2.00 | 2.00 | 2.00 | 2.00 | 2.80 | 2.95 | 3.11 | 3.29 | 3.50 | 3.73 | 4.00 | 4.31 | 4.67 | 5.09 | 5.60 | 5.60 | 5.60 | 5.60 |
| | 57 | 2.00 | 2.00 | 2.00 | 2.00 | 2.00 | 2.85 | 3.00 | 3.17 | 3.35 | 3.56 | 3.80 | 4.07 | 4.38 | 4.75 | 5.18 | 5.70 | 5.70 | 5.70 | 5.70 |
| | 58 | 2.00 | 2.00 | 2.00 | 2.00 | 2.00 | 2.90 | 3.05 | 3.22 | 3.41 | 3.63 | 3.87 | 4.14 | 4.46 | 4.83 | 5.27 | 5.80 | 5.80 | 5.80 | 5.80 |
| | 59 | 2.00 | 2.00 | 2.00 | 2.00 | 2.00 | 2.95 | 3.11 | 3.28 | 3.47 | 3.69 | 3.93 | 4.21 | 4.54 | 4.92 | 5.36 | 5.90 | 5.90 | 5.90 | 5.90 |
| | 60 | 2.00 | 2.00 | 2.00 | 2.00 | 2.00 | 3.00 | 3.16 | 3.33 | 3.53 | 3.75 | 4.00 | 4.29 | 4.62 | 5.00 | 5.45 | 6.00 | 6.00 | 6.00 | 6.00 |

FIGURE 12

VEHICLE STEERING ANGLE POSITION DETERMINATION METHOD

CROSS REFERENCE TO RELATED APPLICATIONS

This application claims priority under 35 U.S.C. 119(e) of U.S. provisional patent application serial No. 60/357,467 filed on Feb. 15, 2002 entitled VEHICLE STEERING ANGLE POSITION DETERMINATION METHOD the entire disclosure of which is hereby incorporated herein by reference.

BACKGROUND OF THE INVENTION

1. Field of the Invention

The present invention relates to a method for estimating the steering wheel angle position of a vehicle based upon data received from a relative position steering angle sensor and other vehicle sensors.

2. Description of the Related Art

Many vehicles today have electronic controllers which utilize data signals obtained from a Steering Angle Sensor ("SAS") to make complex calculations and automatically implement actions based upon those calculations. There are different classes of SAS sensors. Class III sensors provide accurate values immediately after the ignition key is placed in the ON condition.

Class I SAS sensors provide values which are relative to the position of the steering wheel when the ignition key is turned to the ON condition. In other words, these sensors transmit a zero value signal when the key ON condition is initiated regardless of the actual steering wheel position and processing of the SAS signal is required to compute an accurate steering wheel angle value. A variety of different methods are known for processing the relative position SAS sensor signal to estimate the actual steering wheel angle.

SUMMARY OF THE INVENTION

The present invention provides an improved system for estimating the actual steering wheel angle position based upon signals received from a relative position steering angle sensor and other vehicle sensors for measuring various vehicle operating parameters.

The invention comprises, in one form thereof, a method of estimating the true steering angle of a vehicle. The method includes obtaining a relative position steering angle value, obtaining a plurality of vehicle operating parameter values, and calculating a plurality of estimated values wherein each of the values is a function of one of a plurality of different vehicle models and each of the vehicle models includes at least one variable corresponding to one of the plurality of vehicle operating parameter values. The method also includes estimating a steering angle offset value as a function of a weighted average of the plurality of estimated values and estimating the true steering angle value of the vehicle as a function of the relative position steering angle value and the steering angle offset value.

The plurality of different vehicle models may include a yaw rate model, e.g., equation (1), having a variable corresponding to a yaw rate of the vehicle, a lateral acceleration model, e.g., equation (3), having a variable corresponding to a lateral acceleration of the vehicle, a front axle model, e.g., equation (4), having variables corresponding to a front left wheel speed value and a front right wheel speed value, and a rear axle model, e.g., equation (5), having variables corresponding to a rear left wheel speed value and a rear right wheel speed value.

Alternatively, the plurality of different vehicle models may include at least two models selected from the group including a yaw rate model, a lateral acceleration model, a front axle model and a rear axle model. The step of obtaining a plurality of vehicle operating parameters may include obtaining a sensor-measured yaw rate of the vehicle when the yaw rate model is one of the selected models with the yaw rate model having a variable corresponding to the sensor-measured yaw rate. The step of obtaining a plurality of vehicle operating parameters may include obtaining a sensor-measured lateral acceleration of the vehicle when the lateral acceleration model is one of the selected models with the lateral acceleration model having a variable corresponding to the sensor-measured lateral acceleration. The step of obtaining a plurality of vehicle operating parameters may include obtaining a left front wheel speed value and a right front wheel speed value of the vehicle when the front axle model is one of said selected models with the front axle model having variables corresponding to the left front wheel speed value and the right front wheel speed value. The step of obtaining a plurality of vehicle operating parameters may include obtaining a left rear wheel speed value and a right rear wheel speed value of the vehicle when the rear axle model is one of said selected models with the rear axle model having variables corresponding to the left rear wheel speed value and the right rear wheel speed value.

The step of estimating a steering angle offset value as a function of a weighted average of the plurality of estimated values may involve unequally weighting at least two of the plurality of estimated values, e.g., equation (6) wherein $C_1$, $C_2$, $C_3$ and $C_4$ are not all equal. The estimation of the true steering angle value may also be a function of an uncertainty factor wherein the uncertainty factor is a function of a minimum value and a maximum value of the estimated values, e.g., equations (8), (9) and (10).

The method may also include repetitively performing the step of estimating a steering angle offset value and defining a mode value of the method wherein the mode value is a function of the number of calculated steering angle offset value estimates. The mode value and all changes in the mode value are communicated to a controller.

The method may also include the step of selecting data acceptable for use in estimating the steering angle offset value wherein the step of selecting data includes accepting for use data obtained when the sign of a sensor-measured yaw rate of the vehicle (vGimeas) is the same as a model-based yaw rate (vGiVr) calculated using front and rear axle operating parameters; and also accepting for use data obtained when the sign of vGimeas is opposite the sign of vGiVr when relatively straight rearward driving is detected. The detection of relatively straight rearward driving may be defined as when $F_{k+1} > W_3$ and $F_{k+1} = (F_k * W_1 + (vGiVr*vGimeas))/((vGiVr)^2 + (W_1 + W_2))$ wherein $F_k$ is a formulation variable and $W_1$, $W_2$, and $W_3$ are all constants. In one embodiment of the invention, $W_1$ may be defined as a value which is approximately 0.05; $W_2$ may be defined as a value which is approximately 0.80; and $W_3$ may be defined as a value which is approximately −0.3.

The invention comprises, in yet another form thereof, a method of estimating the true steering angle value of a vehicle. The method includes obtaining a relative position steering angle value, obtaining at least one vehicle operating parameter value, and calculating at least one estimated value wherein the estimated value is a function of a vehicle model including at least one variable corresponding to the at least one vehicle operating parameter value. The method also includes estimating a steering angle offset value as a function of the estimated value, estimating the actual steering angle value of the vehicle as a function of the relative position steering angle value and the steering angle offset value and, prior to estimating the steering angle offset value, selecting data acceptable for use in estimating the true steering angle value wherein data acceptable for use includes both data obtained when the sign of a sensor-measured yaw rate of the vehicle (vGimeas) is the same as a model-based yaw rate (vGiVr) calculated using front and rear axle operating parameters and data obtained when the sign of vGimeas is opposite the sign of vGiVr when relatively straight rearward driving is detected.

The detection of relatively straight rearward driving may be defined as when $F_{k+1} > W_3$ and $F_{k+1} = (F_k * W_1 + (vGiVr * vgimeas))/((vGiVr)^2 + (W_1 + W_2))$ wherein $F_k$ is a formulation variable and $W_1$, $W_2$, and $W_3$ are all constants. In one embodiment of the invention, WI may be defined as a value which is approximately 0.05; $W_2$ may be defined as a value which is approximately 0.80; and $W_3$ may be defined as a value which is approximately −0.3.

The invention comprises, in still another form thereof, a method of estimating the true steering angle value of a vehicle. The method includes: (a) obtaining a relative position steering angle value; (b) obtaining at least one vehicle operating parameter value; (c) calculating at least one estimated value, the estimated value being a function of a vehicle model including at least one variable corresponding to the at least one vehicle operating parameter value; (d) estimating a steering angle offset value as a function of the estimated value; (e) estimating the true steering angle value of the vehicle as a function of the relative position steering angle value and the steering angle offset value; (f) repeating steps (a) through (e) and assigning a Percent Certainty value to each estimated true steering angle value, the Percent Certainty value being a function of the number of repetitions of steps (a) through (e); and (g) communicating the estimated true steering angle value and the Percent Certainty value to a controller.

Step (c) may also include calculating a plurality of estimated values using a plurality of different vehicle models and calculating an uncertainty factor as a function of a minimum value and a maximum value of the estimated values. The Percent Certainty value may be a function of the number of repetitions of steps (a) through (e) and the uncertainty factor. The plurality of different vehicle models may include at least two models selected from the group including a yaw rate model, a lateral acceleration model, a front axle model and a rear axle model. The method may also include defining a mode value of the method wherein the mode value is a function of the number of repetitions of steps (a) through (e), and communicating the mode value and all changes in the mode value to a controller.

BRIEF DESCRIPTION OF THE DRAWINGS

The above mentioned and other features and objects of this invention, and the manner of attaining them, will become more apparent and the invention itself will be better understood by reference to the following description of an embodiment of the invention taken in conjunction with the accompanying drawings, wherein:

FIG. 12 is a table of CertFactor values.

The exemplification set out herein illustrates an embodiment of the invention, in one form, and is not intended to be an exhaustive illustration of the invention or to be construed as limiting the scope of the invention to the precise forms disclosed.

DESCRIPTION OF THE INVENTION

Figure 1:
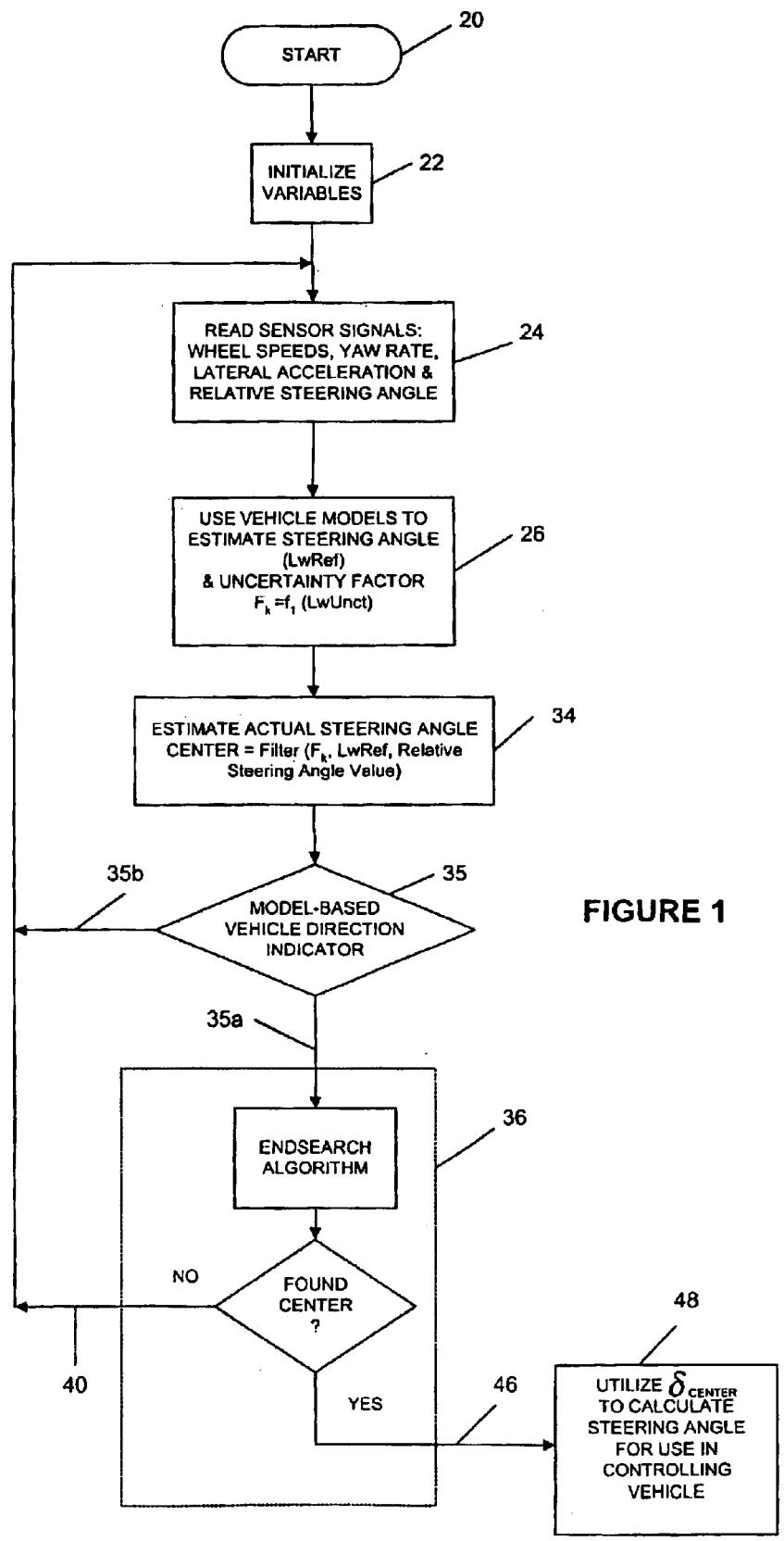
FIG. 1 is a view of a flow chart representing the present invention.
Figure 10:
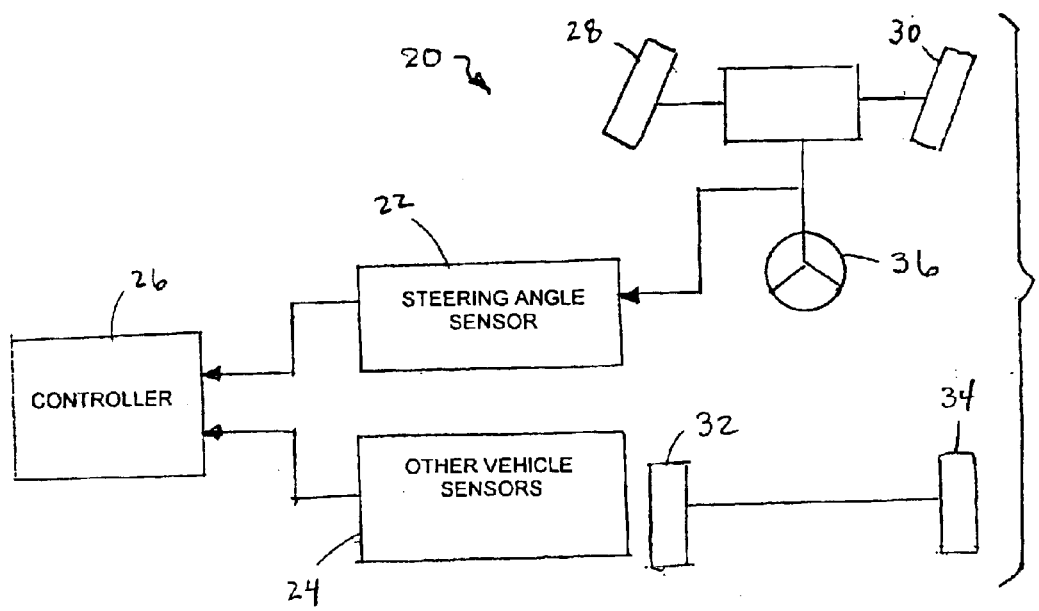
FIG. 10 is a schematic representation of a vehicle.

Referring to the drawings and particularly to FIG. 1, there is shown a flow chart representing the present invention. The embodiment of the present invention illustrated in FIG. 1 is implemented in a vehicle 20 schematically illustrated in FIG. 10 which includes a relative position steering angle sensor 22 and sensors 24 for measuring wheel speeds, yaw rate, lateral acceleration, and other vehicle operating parameters and a programmable logic controller 26. The present invention may be implemented using conventional sensors and controllers which are well known in the art. The illustrated embodiment is employed in a vehicle having left and right front steerable wheels 28, 30 operably coupled to a steering wheel 36 and left and right rear wheels 32, 34 which are not steerable. Alternative embodiments of the present invention could be employed in vehicles having both front and rear steerable wheels.

In vehicles having a relative position steering angle sensor the absolute or true steering angle, δ, is equal to the sum of the relative steering angle position, $δ_{Uncenter}$, provided by the steering angle sensor, and the steering angle offset, $δ_{off}$, this relationship is represented by the following equation: $δ = δ_{Uncenter} + δ_{off}$. The present invention provides a method for estimating the steering angle offset of a relative position steering angle sensor so that the true steering angle may be determined.

Referring to the flow chart of FIG. 1, Start block 20 designates the point at which the ignition is switched to the key ON condition. Immediately following the switching of the ignition to the key ON condition, preselected values are used to initialize variables employed in the present invention as designated by block 22. The variables which are initialized at block 22 include all sensor status checks, center flags, variables $P_1$ through $P_5$ which are explained below, and others.

Sensor signals corresponding to the wheel speeds, yaw rate, lateral acceleration and relative steering angle position are transmitted to the controller as represented by block 24. The vehicle wheel speeds, yaw rate, lateral acceleration and relative position steering angle signals are electrical signals derived from conventional vehicle sensors in a manner known in the art. To correct for a phase lag between the steering input and vehicle body response, a constant value delay is employed with the exemplary embodiment. Block 26 represents the use of the electronic controller to process the vehicle wheel speeds, yaw rate and lateral acceleration input signals in accordance with model equations of the vehicle to determine a steering wheel angle reference signal (LwRef) and an uncertainty factor ($F_k$).

The steering angle reference signal value LwRef is calculated in a multi-step process described below. Yaw rate, lateral acceleration, front axle and rear axle vehicle models are used to calculate individual reference steering angle values and these values are then weighted and combined to determine the steering angle reference value LwRef.

Yaw Rate Model

The steering angle value determined from the yaw rate model (vGi=yaw rate) is designated LwvGi (or LwRef_1) and is calculated in accordance with the following formula:

$$LwvGi = (vGimeas)/(SwAck) \quad (1)$$

Where:

vGimeas=offset corrected, sensor-measured yaw rate (deg/s)

SwAck=Value determined from Ackerman Equation (1/s)

A weighting factor $C_1$ is applied to the yaw rate model value (LwvGi) when combining this value with the other vehicle model values to determine LwRef. The value of $C_1$ in the present embodiment is a constant (8). The value determined from the Ackerman Equation (SwAck) is defined as:

$$SwAck = V_{FzRef}/(I_s * L *[1+(V^2_{FzRef}/V^2_{CH})]) \quad (2)$$

where $I_S$ is the transfer ratio of the steering angle to the wheels and L is the wheelbase. The variables $V_{FzRef}$ and $V_{CH}$ represent the vehicle longitudinal reference speed and characteristic vehicle speed respectively.

Lateral Acceleration Model

The steering angle value determined from the lateral acceleration model (ay=lateral acceleration) is designated LwAy (or LwRef_2) and is calculated in accordance with the following formula:

$$LwAy = (a_{ymeas}/V_{FZRef})/SwAck \quad (3)$$

Where:

$a_{ymeas}$=offset-corrected, sensor-measured lateral acceleration (m/s²)

$V_{FzRef}$=Longitudinal vehicle reference speed (m/s)

SwAck=Value determined from Ackerman Equation (1/s)

Figure 7:
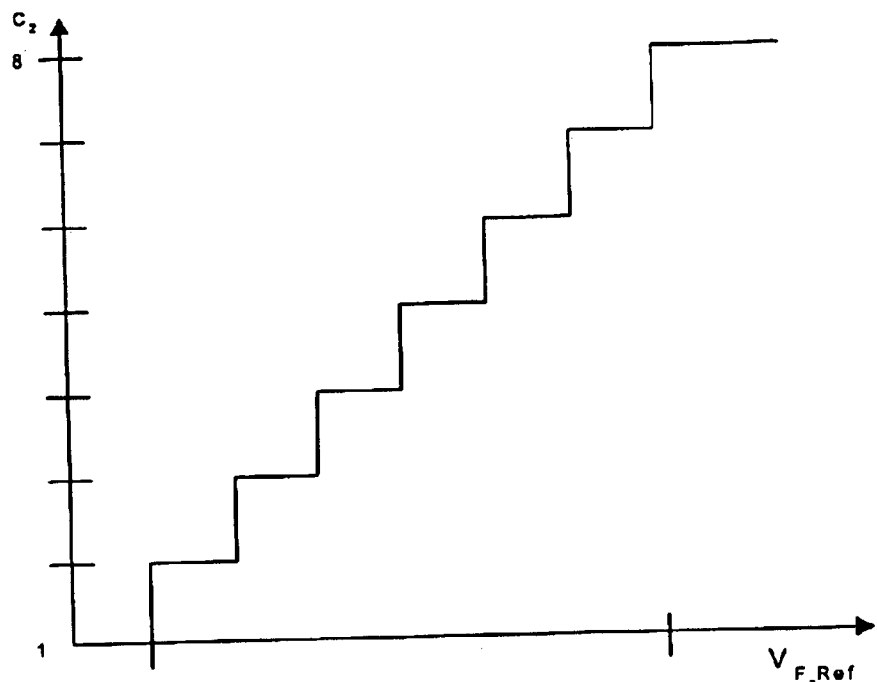
FIG. 7 is a graph providing a schematic representation of the functional relationship between variable $C_2$ and the longitudinal vehicle reference speed ($V_{FzRef}$).

A weighting factor $C_2$ is applied to the lateral acceleration model value (LwAy) when combining this value with the other vehicle model values to determine LwRef. The value of $C_2$ is a function of the longitudinal vehicle reference speed and is increased in a step wise manner with increasing vehicle speeds and ranges from between 1 and 8 as illustrated in FIG. 7.

Axle Models

A front axle model and a rear axle model are presented below. Various factors may introduce noise into these models and thereby degrade the quality of the models. Such factors include the non-homogeneity of the road surface and the non-symmetrical distribution of drive torque between the wheels. To limit the impact of such noise, the axle models may be weighted wherein an increase in the drive torque applied to the axle decreases the weighting of the axle model. The weighting of the front and rear axle models may also be varied for front-wheel drive, rear-wheel drive and all-wheel drive vehicles. For example, in the present embodiment, for a front-wheel drive vehicle, a full weighting is assigned to the rear axle model because no drive torque is influencing the rear axle (e.g., a weighting of 8) and the front axle model receives a weighting based upon the drive torque applied to the front axle (e.g., a weighting of between 1 and 8). Similarly, for a rear-wheel drive vehicle, a full weighting is assigned to the front axle model because no drive torque is influencing the front axle (e.g., a weighting of 8) and the rear axle model receives a weighting based upon the drive torque applied to the rear axle (e.g., a weighting of between 1 and 8). For an all-wheel drive vehicle, both the front and rear axle models receive weightings which vary based upon the drive torque applied to the front and rear axle respectively (e.g., weightings of between 1 and 8). Alternative embodiments could employ different weighting schemes or values to the front and rear axle models. For example, instead of varying the weighting factor as a function of drive train torque applied to the axle, the weighting factor of the driven axles could vary as a function of the longitudinal vehicle speed.

Front Axle Model

The steering angle value determined from the front axle model is designated LwVrVA (or LwRef_3) and is calculated in accordance with the following formula:

$$LwVrVA = [(vV_L - vV_R)/L_v]/SwAck \quad (4)$$

Where:

$vV_L$=left front wheel speed (m/s)

$vV_R$=right front wheel speed (m/s)

$L_v$=front axle track width (m)

SwAck=value from Ackerman Equation (1/s)

Figure 8:
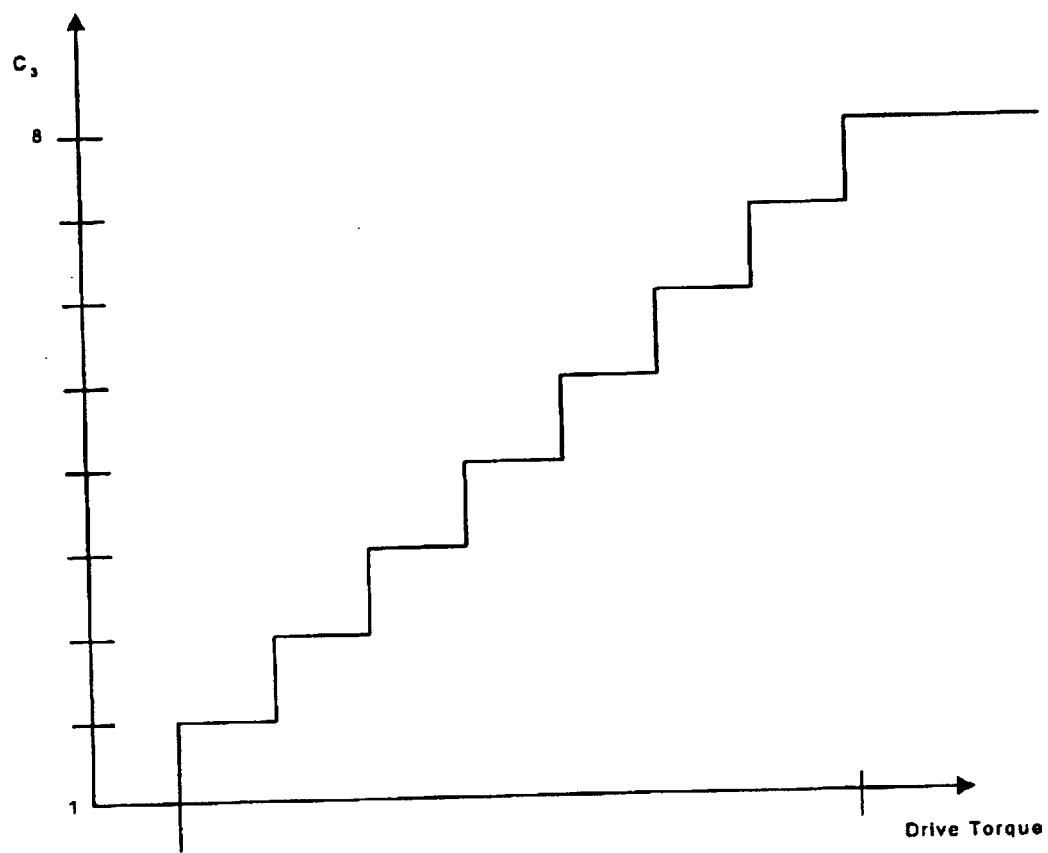
FIG. 8 is a graph providing a schematic representation of the functional relationship between variable $C_3$ and the drive torque applied to the front drive train.

A weighting factor $C_3$ is applied to the front axle model value (LwVrVA) when combining this value with the other vehicle model values to determine LwRef. In the present embodiment, the weighting factor $C_3$ is a constant (8) when the front axle is a non-driven axle. When the front axle is a driven axle, $C_3$ varies from 1 to 8 in a step wise fashion as a function of the front drive train torque as exemplified by the graph shown in FIG. 8 (the drive torque values are decreasing from left to right in the illustrated graph).

Rear Axle Model

The steering angle value determined from the rear axle model is designated LwVrHA (or LwRef_4) and is calculated in accordance with the following formula:

$$LwVrHA = [(vH_L - vH_R)/L_H]/SwAck \quad (5)$$

Where:

$vH_L$=left rear wheel speed (m/s)

$vH_R$=right rear wheel speed (m/s)

$L_H$=rear axle track width (m)

SwAck=value from Ackerman Equation (1/s)

Figure 9:
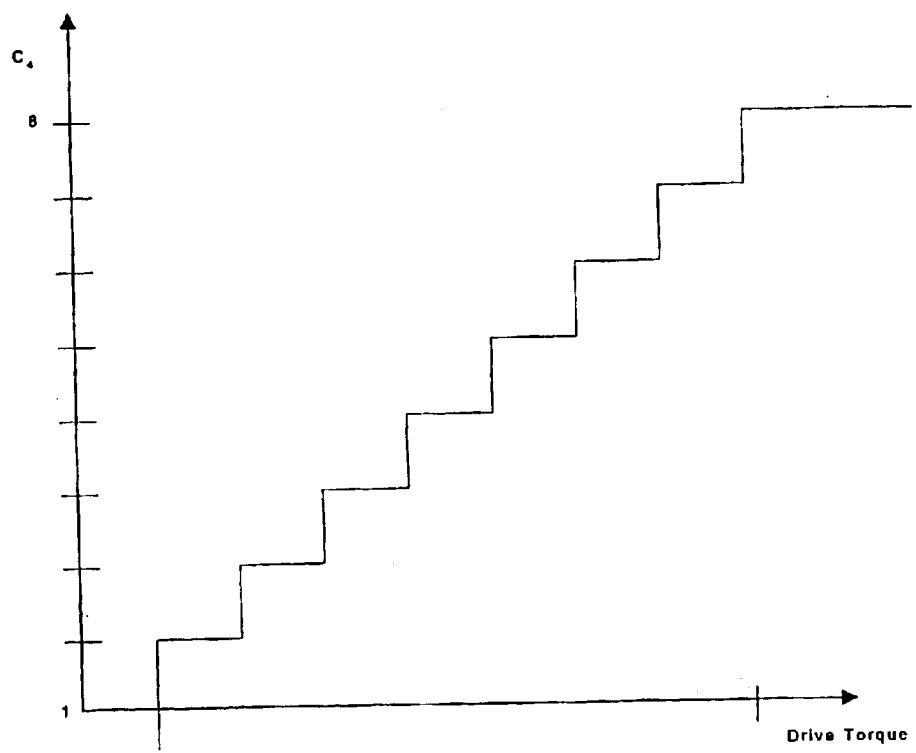
FIG. 9 is a graph providing a schematic representation of the functional relationship between variable $C_4$ and the drive torque applied to the rear drive train.

A weighting factor $C_4$ is applied to the rear axle model value (LwVrHA) when combining this value with the other vehicle model values to determine Lwref. In the present embodiment, the weighting factor $C_4$ is a constant (8) when the rear axle is a non-driven axle. When the rear axle is a driven axle, $C_4$ varies from 1 to 8 in a step wise fashion as a function of the rear drive train torque as exemplified by the graph shown in FIG. 9 (the drive torque values are decreasing from left to right in the illustrated graph).

Steering Angle Reference Value Calculation

After calculating steering angle values based upon the four models described above, a steering angle reference value is calculated in accordance with the following formula:

$$LwRef=[(C_1*LwvGi)+(C_2*LwAy)+(C_3*LwVrVA)+(C_4*LwVrHA)]/(C_1+C_2+C_3+C_4) \quad (6)$$

where: $1 \leq C_1, C_2, C_3, C_4, \leq 8$

An offset value ($\delta_{Off}$) is then calculated by determining the difference between the relative steering angle position signal ($\delta_{Uncenter}$) generated by the SAS and the steering angle reference signal (LwRef) calculated as described above. The relative steering angle position signal is obtained by using one of the procedures for converting the out of phase pulses of the relative position steering angle sensor and generating a value representing a relative steering angle position ($\delta_{Uncenter}$) which are well known in the art. The offset value ($\delta_{Off}$) is calculated as follows:

$$\delta_{Off}=\delta_{Uncenter}-LwRef \quad (7)$$

Figure 2:
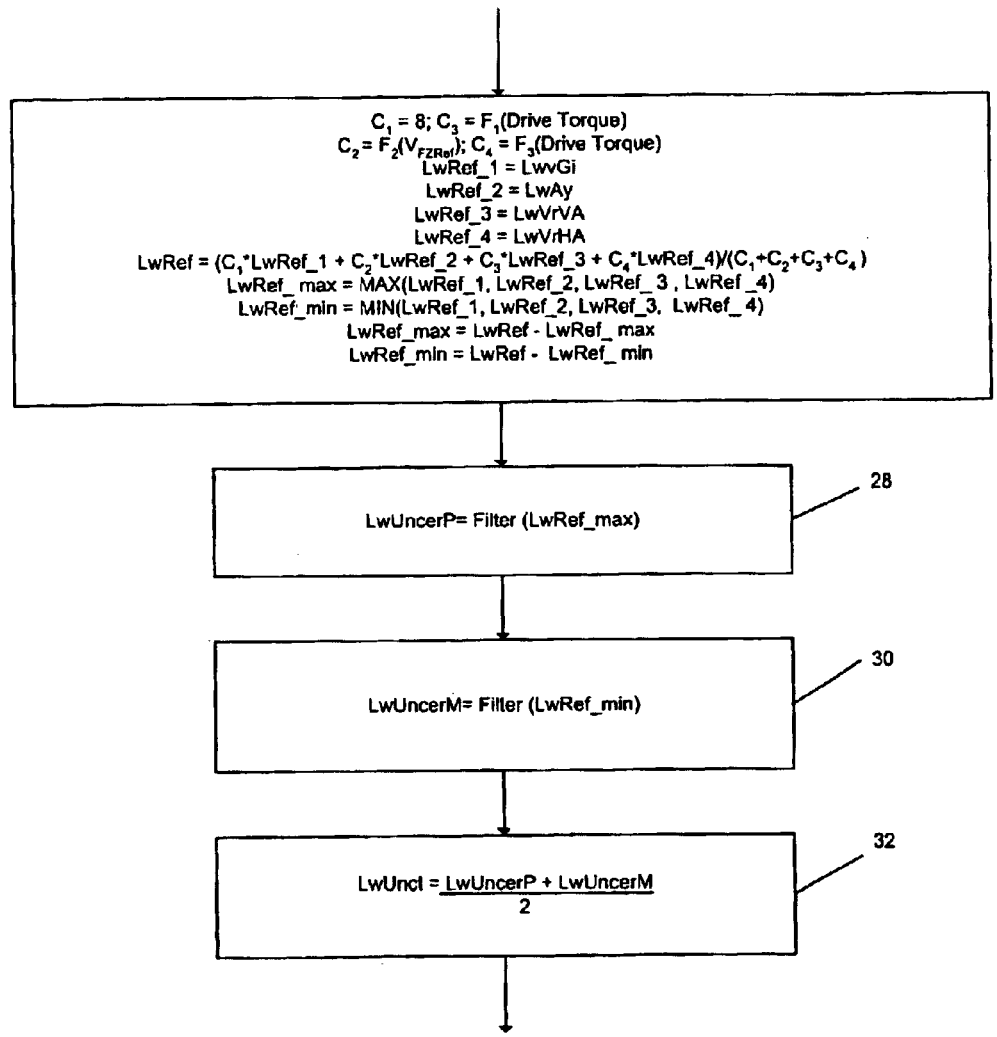
FIG. 2 is a view of a flow chart representing the determination of an uncertainty factor.

The steering angle reference signal (LwRef) calculated at block 26 has some uncertainty associated with it due to signal noise and estimation inaccuracy. The process illustrated by the flow chart set forth in FIG. 2 seeks to quantify this uncertainty. As illustrated in FIG. 2, this process involves computing maximum and minimum values from the models.

Figure 3:
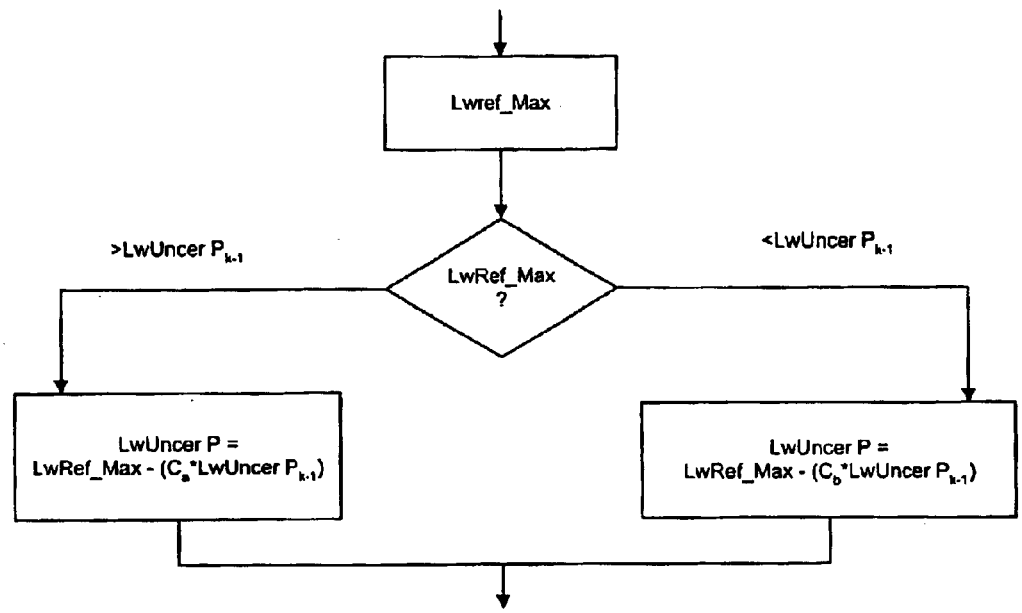
FIG. 3 is a view of a flow chart representing the determination of a variable used in determining the uncertainty factor which is related to maximum uncertainty values.
Figure 4:
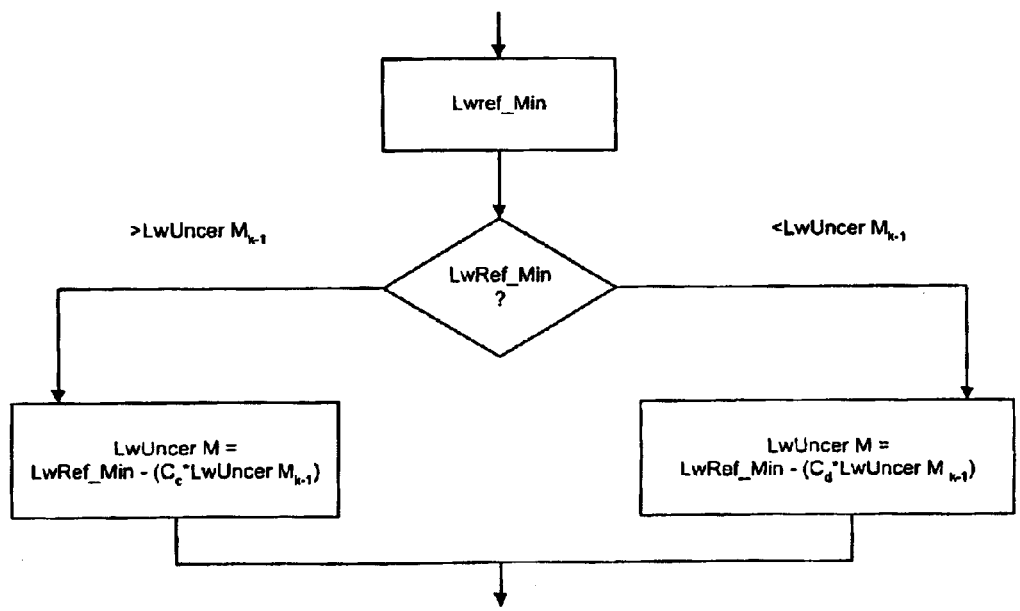
FIG. 4 is a view of a flow chart representing the determination of a variable used in determining the uncertainty factor which is related to minimum uncertainty values.

After calculating the reference values for each of the models, a maximum and a minimum value are selected. Then LwRef_Max is set as the difference of the maximum and the most recent LwRef, and LwRef_Min as the difference of the minimum and the most recent LwRef. LwUncerP and LwUncerM are defined as the first order asymmetrically filtered values of LwRef_Max and LwRef_Min respectively. The determination of LwUncerP is represented by box 28 in FIG. 2 and is shown in greater detail in FIG. 3. The determination of LwUncerM is represented by box 30 in FIG. 2 and is shown in greater detail in FIG. 4. Variables $C_a$, $C_b$, $C_c$ and $C_d$ shown in FIGS. 3 and 4 are constants which in the present embodiment have the following values: $C_a=\frac{1}{2}$; $C_b=\frac{1}{20}$; $C_c=\frac{1}{2}$; and $C_d=\frac{1}{20}$. These values may be independently altered for other embodiments.

Once LwUncerP and LwUncerM have been determined, the uncertainty factor LwUnct is calculated in accordance with the following formula and as represented by box 32 in FIG. 2:

$$LwUnct = \frac{LwUncerP + LwUncerM}{2} \quad (8)$$

The uncertainty factor in combination with the offset of equation (7) are then used as filter inputs to determine another steering angle offset ($\delta_{Center}$) as represented by box 34 in FIG. 1. This new offset ($\delta_{Center}$) is designated "center" in box 34. This determination of the steering angle "center" is based upon a filtering process defined by the following equation:

$$\delta_{CenterK+1}=\delta_{CenterK}+F_k*(\delta_{Off}-\delta_{CenterK}) \quad (9)$$

where k is the time index and $F_k$ denotes the filter coefficient. In this approach the filter coefficient is not a constant, but a function of uncertainty of the estimated signal LwRef and is calculated in accordance with the following equation:

$$F_k = \frac{C_F}{Lwunct} \quad (10)$$

where $C_F$ is a constant. In the disclosed embodiment, $C_F$ has a value of 8.

After calculating a filtered offset value at block 34 as described above, the system performs a check to determine if the vehicle is traveling forward as indicated by block 35 in FIG. 1. The model-based vehicle direction indicator process or "Vehicle Direction Indicator" used in block 35 is illustrated in greater detail in FIG. 6. The variables presented in FIG. 6 have the following definitions:

F=Formulation variable

SwAck=Value from Ackerman Equation (1/s)

$W_1$=regression weighting (0.05)

$W_2$=regression weighting (0.80)

LwVrVA=steering angle value (deg.) determined from front axle model (Equation 4)

LwVrHA=steering angle value (deg.) determined from rear axle model (Equation 5)

$rG_{ang}$=reverse position gear lever indicator vGimeas=offset corrected measured yaw rate (deg/s)

vGiVr=model based yaw rate from front and rear axle (deg/s)

$$vGiVr=([LwVrVA+LwVrHA]/2)*SwAck \quad (11)$$

RearD=rearward driving indicator having a value of 0, 1, or 2, wherein 0=no rearward driving detected; 1=suspected rearward driving detected; and 2=rearward driving detected W3=rearward driving threshold for F (−0.3)

Figure 6:
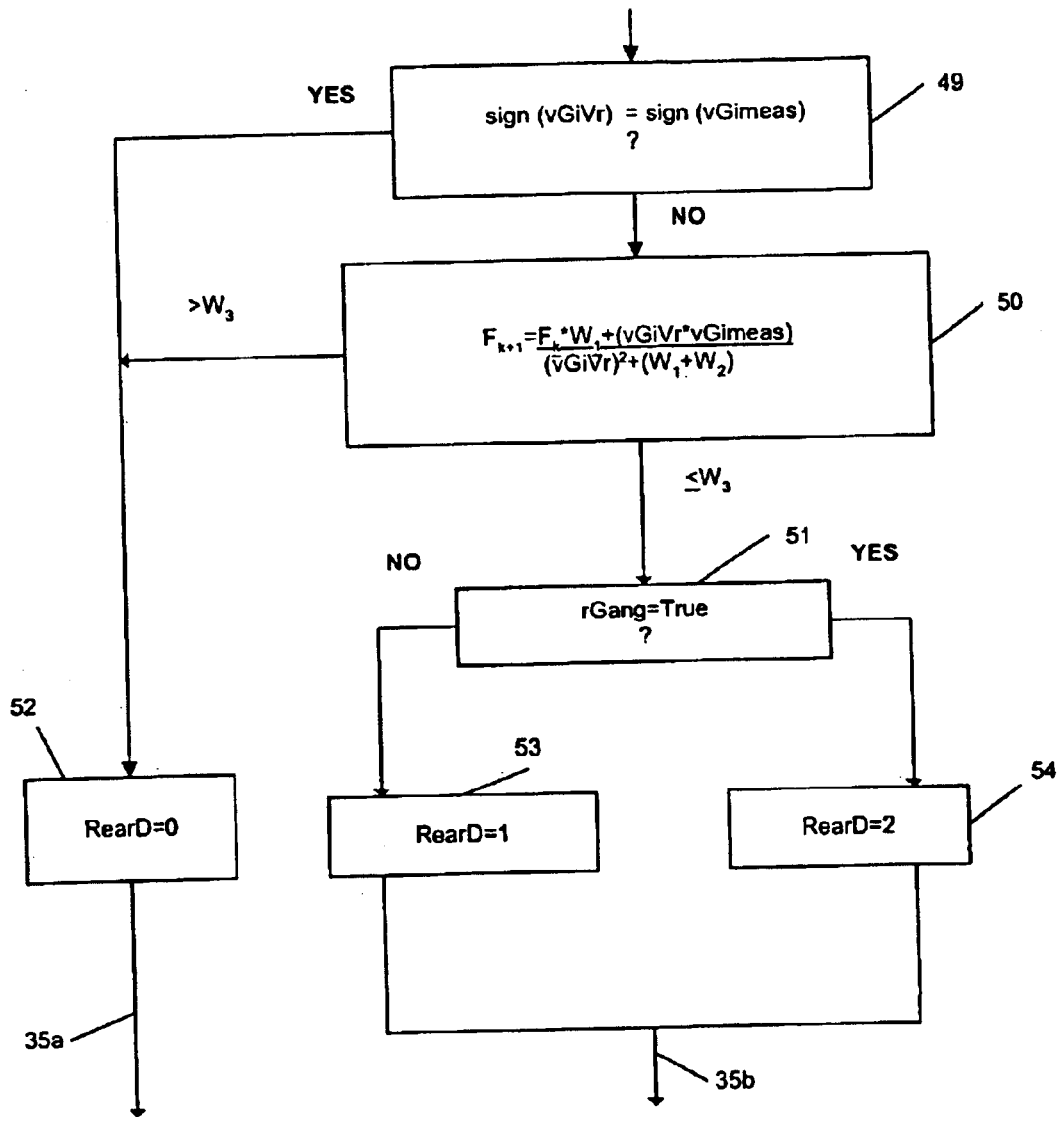
FIG. 6 is a flow chart representing a detailed view of decision box 35 illustrated in FIG. 1.

As illustrated by FIGS. 1 and 6, if RearD is determined to be 1 or 2, rearward driving is either suspected or has been detected and the process returns to block 24 without performing the EndSearch Algorithm as indicated by line 35b. If the value of RearD is determined to be 0, the EndSearch Algorithm (as described in greater detail below) is implemented as indicated by line 35a.

The Vehicle Direction Indicator identifies two basic sets of maneuvers. One set of maneuvers are those that will generate an accurate and acceptable model for use in "center" searching. The other set are those maneuvers that will generate an inaccurate and unacceptable model for use in the "center" search procedure. The RearD=0 condition includes acceptable backward driving patterns. The RearD=0 condition also includes all forward driving conditions (either straight forward, left turn forward or right turn forward). When RearD is 0, the "center" search process is allowed to proceed. However, whenever RearD is 1 or 2, rearward driving of the type not acceptable for "center" searching has been detected and the "center" search process is not allowed to further proceed.

The process to determine rearward driving begins in box 49 of FIG. 6. In box 49, the algorithm checks the sign of the yaw rate model (vGiVr) as computed by equation 11 and which is based on an average of the front- and rear-axle yaw rate models. The sign of vGiVr is compared with the sign of the offset corrected measured yaw rate (vGimeas). If the signs of vGiVr and vGimeas are the same, the process goes to box 52. In box 52, RearD is set to numerical 0. From box 52, the process proceeds, as indicated by line 35a, to the EndSearch Algorithm as represented by dashed outline 36.

Alternatively, if the signs of vGiVr and vgimeas are not the same, the process proceeds to box 50. In box 50, formulation variable F is calculated according to the equation shown in box 50. The calculated value of F is compared with the reverse driving threshold W3. If the numerical value of F is greater than W3, the algorithm moves to box 52. In box 52, RearD is set to numerical zero and the process advances, as indicated by line 35a, and performs the End-Search Algorithm as represented by dashed outline 36.

At box 50, if the calculated value of F is less or equal to W3, the process proceeds to condition box 51. At box 51, the process checks if the reverse position gear lever indicator, rGang is set. If rGang is not set, then the result of conditional box 51 is NO and the process transfers to box 53. At box 53, RearD is updated to numerical one and the process returns to block 24 as indicated by line 35b without performing the EndSearch Algorithm.

On the other hand, when the result of the check performed by conditional box 51 is YES, the process transfers to box 54 where RearD is updated to numerical two. From box 54, the algorithm returns to block 24 as indicated by line 35b without performing the EndSearch Algorithm.

Described in more general terms, the values of RearD correspond to the following driving patterns:

RearD=0 results from all types of forward driving (straight line, left and right turns) and relatively straight rearward driving; and RearD=1 or 2 results from rearward driving right turn and rearward driving left turn.

Figure 5:
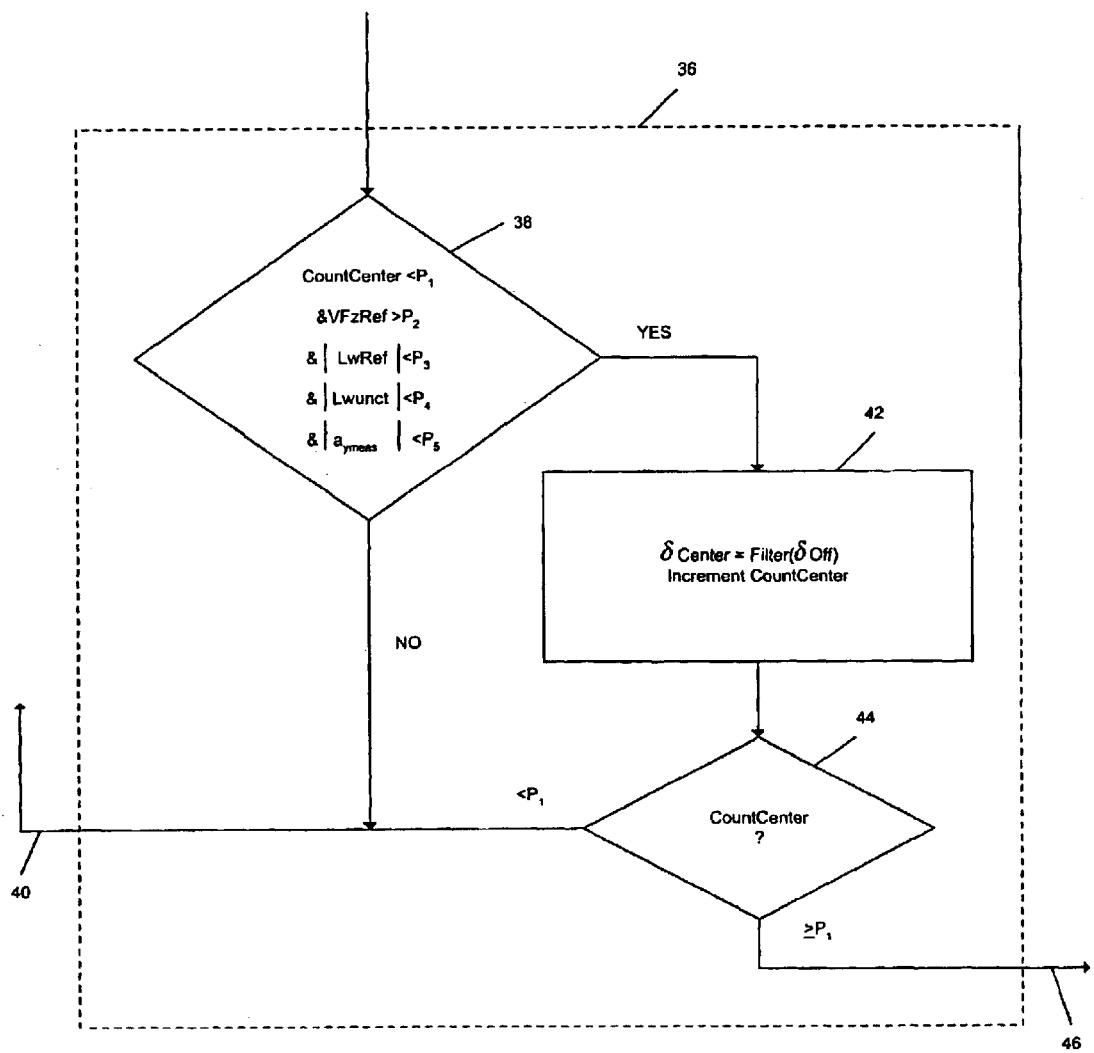
FIG. 5 is a view of flow chart representing the EndSearch Algorithm of the present invention.

If the value for RearD is 0, several parameters are checked to determine whether the filtered offset value should be selected as the final offset value for use until the ignition is switched to an OFF condition or whether the process should return to block 24. This determination is represented on the flow chart shown in FIG. 1 as taking place within dashed block 36 and is referred to as the EndSearch Algorithm. FIG. 5 illustrates the determination process within dashed block 36 in greater detail.

As best seen in FIG. 5, the EndSearch Algorithm uses a counter referred to as the CountCenter and checks four vehicle operating parameters. As shown in block 38, the EndSearch Algorithm checks to see if 1) the counter value (CountCenter) is less than a predetermined value ($P_1$); 2) the longitudinal reference vehicle speed ($V_{FzRef}$) is greater than a predetermined value ($P_2$); 3) if the absolute value of the steering angle reference value (LwRef) is less than a predetermined value ($P_3$); 4) if the absolute value of the uncertainty factor (LwUnct) is less than a predetermined value ($P_4$); and 5) if the absolute value of the offset corrected lateral acceleration ($a_{ymeas}$) is less than a predetermined value ($P_5$).

If not all of these conditions represented in box 38 are satisfied, $\delta_{Center}$ is not evaluated, the CountCenter is not incremented and the process returns to block 24 as indicated by line 40. Upon return to block 24, sensor signals are read and processed again as described above. If, on the other hand, all of these conditions in box 38 are satisfied, the offset value ($\delta_{Center}$) used to calculate the steering angle value for use in controlling the vehicle is set as the offset value calculated in box 34 and the CountCenter value is incremented as represented by box 42. The CountCenter value is then compared to the value $P_1$ at block 44. If the CountCenter value is less than $P_1$, the process returns to block 24 as indicated by line 40 and sensor signals are read and processed again as described above. If the CountCenter value is equal to or greater than $P_1$, the offset value ($\delta_{Center}$) is selected as the final offset value for use in calculating the steering angle position until the ignition is switched to an OFF condition as indicated by line 46 and box 48. Thus, in box 48 the true steering angle value is estimated by combining the offset value ($\delta_{Center}$) with the steering angle value obtained from the relative position steering angle sensor.

The parameters $P_1$, $P_2$, $P_3$, $P_4$ and $P_5$ are chosen based upon various considerations which, in the present embodiment, utilize the following considerations:

$P_1$ is chosen based upon the number of control loop iterations considered necessary for the filtered offset values to converge.

$P_2$ is chosen based upon the minimum vehicle reference speed at which all relevant vehicle sensor values are reasonably accurate.

$P_3$ is chosen based upon the maximum steering angle value which maintains the validity of the models.

$P_4$ is chosen based upon a maximum acceptable dispersion among all the models.

$P_5$ is chosen based upon the maximum vehicle lateral acceleration which maintains the validity of the models.

Modes

Some embodiments of the present invention may utilize a status field (CFAMode) which reflects the progress which has been made towards determining the steering angle offset value. The CFAMode value is incrementally adjusted up to 4 with greater values indicating greater progress in determining the steering angle offset. At ignition key ON, CFA-Mode is zero. Controller 26 is programmed to include a Controller Release System Module Group which is separate from the software module which implements the process for determining the steering angle offset value (the center find algorithm module or "CFA", i.e., the "center" search process). The Controller Release System Module Group interacts with the CFA and other software modules utilized by controller 26. CFAMode remains zero until the Controller Release System Module Group ("CRS MG") sets CFA_Target to 1 thereby commanding that CFAMode be set to 1. When CFAMode is 1, the center search process may begin (provided that any other necessary conditions are also satisfied). At the instant when CFAMode is 1, CFA_Actual is also set to 1 to notify the CRS MG of the actual status of the CFA. The CRS MG continuously performs a status check of the entire system including but not limited to the CFA. Once the CRS MG determines that the system is favorable for the CFA to continue, the CRS MG sets CFA_Target to 2. Table 1 presented below sets forth criteria for progressing from CFAMode 1 through CFAMode 4 used by the exemplary embodiment.

After the CRS MG sets CFA_Target to 2 the CFA continues the center search process until tCenterFnd exceeds 40 and CFAMode is set to 2. "tCenterFnd" is an incremental counter that incrementally increases for each control loop that successfully determines an offset value. In the exemplary embodiment tCenterFnd is incrementally increased by 4. The tCenterFnd value is also used in the determination of when to incrementally adjust the value of CFAMode as set forth in Table 1 below. The expected accuracy of the offset value for each of the different CFAModes is also set forth in Table 1.

TABLE 1

CFAMode Values

| tCenterFnd | CFAMode | Accuracy |
| --- | --- | --- |
| 0–40 | 1 | — |
| 41–60 | 2 | \|20\|deg. or better |
| 61–90 | 3 | \|10\|deg. or better |
| (91–105) or (vFzRef > 5 km) | 4 | \|5\|deg. or better |

As described in Table 1, when CFAMode has reached 2, the CFA is expected to have defined the offset value to an accuracy better or equal to |20| degrees. When CFAMode is set to 2, CFA_Actual is also instantly set to 2 to notify the CRS MG of the present status of the CFA. The CRS MG continually performs a systems status check and sets CFA_Target to 3 when the CRS MG verifies that center search process can proceed to mode 3. In verifying that the CFA can proceed, the CRS MG might verify that certain operating parameters are satisfied, e.g., that systems voltage is within acceptable limits or that all sensors are functioning properly. Once the CFA_Target is set to 3, the CFA continues to proceed with the center search process and the tCenterFnd counter incrementally increases until exceeding 60 and the CFAMode is set to 3.

Figure 11:
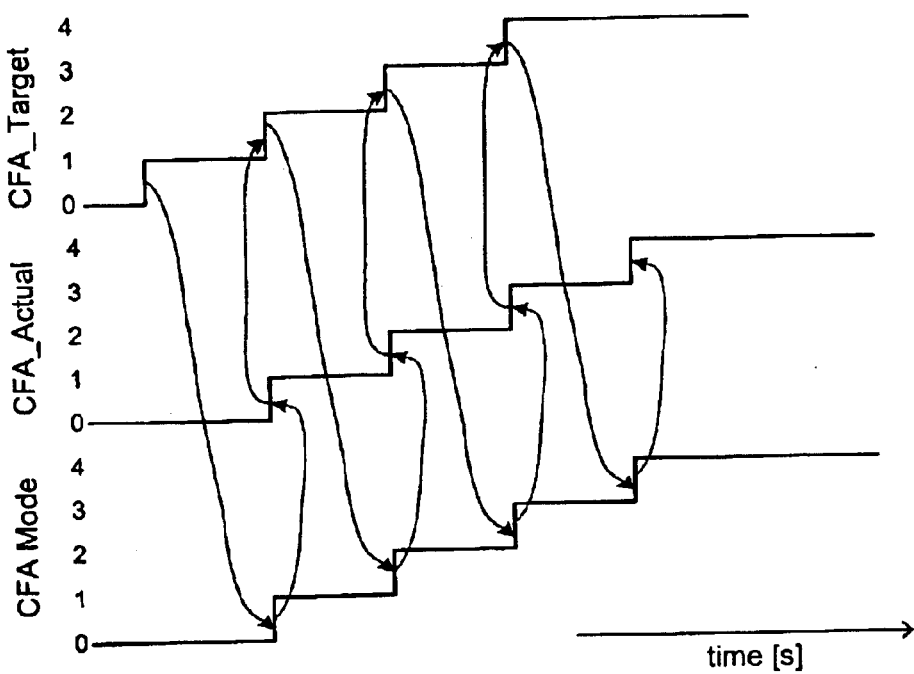
FIG. 11 is a graphical representation of the mode progression of the exemplary embodiment.

When CFAMode reaches 3, CFA_Actual is set to 3 and the offset value is expected to have an accuracy better or equal to |10| degrees. This process is repeated until CFA_Actual becomes 4. The CFA search process is complete when CFAMode and CFA_Actual are both 4 and the final offset value is then used to calculate the steering angle until the vehicle is turned off. FIG. 11 illustrates the progression of values for CFA_Target, CFAMode and CFA_Actual.

The CRS MG may abort the CFA process if it determines that the system is not conducive to continue with the CFA process, e.g., if certain vehicle operating parameters do not satisfy certain predetermined threshold values.

Percent Certainty

When employing the CFAMode values discussed above, it is possible to have a relatively accurate steering angle offset value before CFAMode reaches 4, i.e., when the CFAMode is 2 or 3. It may therefore be prudent to release center information for use by the vehicle Electronic Stability Program (ESP) when the CFAMode is 2 or greater. When the CFAMode is still 2, a Percent Certainty value (CenterFndPct) is used in the calculation of threshold values used to determine if the ESP system will intervene in the control of the vehicle.

The Percent Certainty is a fuzzy set which depends on two independent variables, tCenterFnd and LwUnct. A two step process is used to determine the values of Percent Certainty.

Step 1 involves the determination of "CertFactor". For LwUnct between |20| and |10| deg, tCenterFnd is normalized for every value between 40 and 60. (We recall that when tCenterFnd exceeds 40, CFAMode transitions to 2 and when tCenterFnd exceeds 60, CFAMode becomes 3.) Normalizing is achieved by equation (12):

$$CertFactor = \left(\frac{tCenterFnd}{LwUnct}\right)[-/deg] \quad (12)$$

As shown in Table 1, we note that |20| degrees is the worst accuracy for entry into CFAMode 2 and that |10| degrees is the worst accuracy for exiting CFAMode 2 and entering CFAMode 3. From the table of CertFactor values shown in FIG. 12 (generated from equation 12) the minimum and maximum values of CertFactor are 2 and 6 respectively.

Step 2 in determining CenterFndPct is the linear piecewise translation of the CertFactor determined by equation (12) by using equation (13):

$$CenterFndPct = 100 - \left(\frac{99}{4}\right) * (6 - CertFactor)[\%]; \quad (13)$$

$$2 \leq CertFactor \leq 6$$

Figure 13:
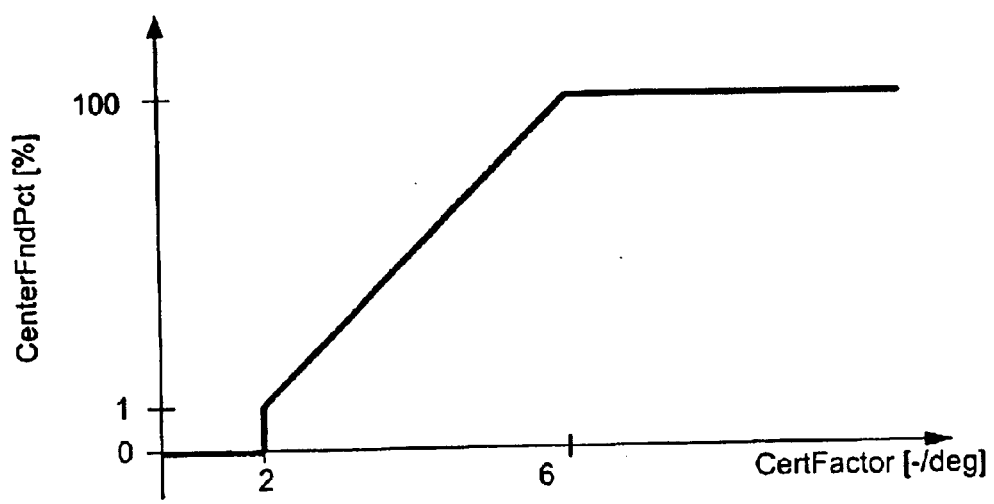
FIG. 13 is a graphical representation of the relationship between CertFactor values and Percent Certainty values used in the exemplary embodiment.

The relationship between CenterFndPct and CertFactor is illustrated in FIG. 13.

Using the worst case scenario as an example, when the CFAMode first enters mode 2, if tCenterFnd is 40 and accuracy is |20| degrees, CertFactor will be 2 and CerterFndPct will be 1%. Similarly, the worst case scenario for when CFAMode is exiting CFAMode 2 and entering CFAMode 3, i.e., when tCenterFnd is 60 and accuracy is 101 degrees, CertFactor will be 6 and CenterFndPct will be 100%.

The CenterFndPct value can be communicated with the current steering angle value to other ESP modules, e.g., anti-lock braking system (ABS) and body stability controller modules, while the CFAMode is still 2 to allow the other ESP modules to perform some control functions before the CFA process has been completed and a final offset value calculated. By providing a CenterFndPct value which is indicative of the accuracy of the steering angle value, the other ESP modules could use the CenterFndPct value to qualify or limit the use of the steering angle value or in the calculation of threshold values used to determine if the ESP system will intervene in the control of the vehicle.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A method of estimating the true steering angle value of a vehicle, said method comprising:

obtaining a relative position steering angle value;

obtaining a plurality of vehicle operating parameter values;

calculating a plurality of estimated values, each of said values being a function of one of a plurality of different vehicle models, each of said vehicle models including at least one variable corresponding to one of said plurality of vehicle operating parameter values;

estimating a steering angle offset value as a function of a weighted average of said plurality of estimated values; and estimating the true steering angle value of the vehicle as a function of said relative position steering angle value and said steering angle offset value.

2. The method of claim 1 wherein said plurality of different vehicle models includes at least two models selected from the group including a yaw rate model, a lateral acceleration model, a front axle model and a rear axle model.

3. The method of claim 2 wherein said step of obtaining a plurality of vehicle operating parameters includes obtaining a sensor-measured yaw rate of said vehicle and said yaw rate model is one of said selected models, said yaw rate model having a variable corresponding to said sensor-measured yaw rate.

4. The method of claim 2 wherein said step of obtaining a plurality of vehicle operating parameters includes obtaining a sensor-measured lateral acceleration of said vehicle and said lateral acceleration model is one of said selected models, said lateral acceleration model having a variable corresponding to said sensor-measured lateral acceleration.

5. The method of claim 2 wherein said step of obtaining a plurality of vehicle operating parameters includes obtaining a left front wheel speed value and a right front wheel speed value of said vehicle and said front axle model is one of said selected models, said front axle model having variables corresponding to said left front wheel speed value and said right front wheel speed value.

6. The method of claim 2 wherein said step of obtaining a plurality of vehicle operating parameters includes obtaining a left rear wheel speed value and a right rear wheel speed value of said vehicle and said rear axle model is one of said selected models, said rear axle model having variables corresponding to said left rear wheel speed value and said right rear wheel speed value.

7. The method of claim 1 wherein said plurality of different vehicle models includes a yaw rate model having a variable corresponding to a yaw rate of said vehicle, a lateral acceleration model having a variable corresponding to a lateral acceleration of said vehicle, a front axle model having variables corresponding to a front left wheel speed value and a front right wheel speed value of said vehicle, and a rear axle model having variables corresponding to a rear left wheel speed value and a rear right wheel speed value of said vehicle.

8. The method of claim 1 wherein said step of estimating a steering angle offset value as a function of a weighted average of said plurality of estimated values comprises unequally weighting at least two of said plurality of estimated values.

9. The method of claim 1 wherein said estimation of the actual steering angle value is also a function of an uncertainty factor, said uncertainty factor being a function of a minimum value and a maximum value of said estimated values.

10. The method of claim 1 further comprising the step of selecting data acceptable for use in estimating the steering angle offset value, said step of selecting data includes accepting for use data obtained when the sign of a sensor-measured yaw rate of the vehicle (vGimeas) is the same as a model-based yaw rate (vGiVr) calculated using front and rear axle operating parameters; and also accepting for use data obtained when the sign of vGimeas is opposite the sign of vGiVr when relatively straight rearward driving is detected.

11. The method of claim 10 wherein relatively straight rearward driving is detected when $F_{k+1} > W_3$ and $F_{k+1} = (F_k * W_1 + (vGiVr * vGimeas))/((vGiVr)^2 + (W_1 + W_2))$ wherein $F_k$ is a formulation variable and $W_1$, $W_2$, and $W_3$ are all constants.

12. The method of claim 11 wherein $W_1$ is approximately 0.05; $W_2$, is approximately 0.80; and $W_3$ is approximately −0.3.

13. The method of claim 1 wherein said step of estimating a steering angle offset value is repetitively performed and said method further comprises:

defining a mode value of said method, said mode value being a function of the number of calculated steering angle offset value estimates; and communicating said mode value and all changes in said mode value to a controller.

14. A method of estimating the true steering angle value of a vehicle, said method comprising:

obtaining a relative position steering angle value;

obtaining at least one vehicle operating parameter value;

calculating at least one estimated value, said estimated value being a function of a vehicle model including at least one variable corresponding to said at least one vehicle operating parameter value;

estimating a steering angle offset value as a function of said estimated value;

estimating the true steering angle value of the vehicle as a function of said relative position steering angle value and said steering angle offset value; and wherein prior to estimating the actual steering angle value said method includes:

selecting data acceptable for use in estimating said steering angle offset value, wherein data acceptable for use includes data obtained when the sign of a sensor-measured yaw rate of the vehicle (vGimeas) is the same as a model-based yaw rate (vGiVr) calculated using front and rear axle operating parameters; and data obtained when the sign of vGimeas is opposite the sign of vGiVr when relatively straight rearward driving is detected.

15. The method of claim 14 wherein relatively straight rearward driving is detected when $F_{k+1} > W_3$ and $F_{k+1} = (F_k * W_1 + (vGiVr * vGimeas))/((vGiVr)^2 + (W_1 + W_2))$ wherein $F_k$ is a formulation variable and $W_1$, $W_2$, and $W_3$ are all constants.

16. The method of claim 15 wherein $W_1$ is approximately 0.05; $W_2$, is approximately 0.80; and $W_3$ is approximately −0.3.

17. A method of estimating the true steering angle value of a vehicle, said method comprising:

(a) obtaining a relative position steering angle value;

(b) obtaining at least one vehicle operating parameter value;

(c) calculating at least one estimated value, said estimated value being a function of a vehicle model including at least one variable corresponding to said at least one vehicle operating parameter value;

(d) estimating a steering angle offset value as a function of said estimated value;

(e) estimating the true steering angle value of the vehicle as a function of said relative position steering angle value and said steering angle offset value;

(f) repeating steps (a) through (e) and assigning a Percent Certainty value to each estimated true steering angle value, said Percent Certainty value being a function of the number of repetitions of steps (a) through (e); and (g) communicating said estimated true steering angle value and said Percent Certainty value to a controller.

18. The method of claim 17 wherein step (c) comprises calculating a plurality of estimated values using a plurality of different vehicle models and calculating an uncertainty factor as a function of a minimum value and a maximum value of said estimated values; and wherein said Percent Certainty value is a function of the number of repetitions of steps (a) through (e) and said uncertainty factor.

19. The method of claim 18 wherein said plurality of different vehicle models includes at least two models selected from the group including a yaw rate model, a lateral acceleration model, a front axle model and a rear axle model.

20. The method of claim 19 further comprising the step of selecting data acceptable for use in estimating the steering angle offset value, said step of selecting data includes accepting for use data obtained when the sign of a sensor-measured yaw rate of the vehicle (vGimeas) is the same as a model-based yaw rate (vGiVr) calculated using front and rear axle operating parameters; and also accepting for use data obtained when the sign of vGimeas is opposite the sign of vGiVr when relatively straight rearward driving is detected.

21. The method of claim 20 wherein relatively straight rearward driving is detected when $F_{k+1} > W_3$ and $F_{k+1} = (F_k * W_1 + (vGiVr * vGimeas))/((vGiVr)^2 + (W_1 + W_2))$ wherein $F_k$ is a formulation variable and $W_1$, $W_2$, and $W_3$ are all constants.

22. The method of claim 19 further comprising:

defining a mode value of said method, said mode value being a function of the number of repetitions of steps (a) through (e); and communicating said mode value and all changes in said mode value to a controller.

* * * * *